Oct. 20, 1942.                J. A. CUMMINGS                 2,299,567
                           SEED POTATO CUTTER
                          Filed July 8, 1941              2 Sheets-Sheet 1
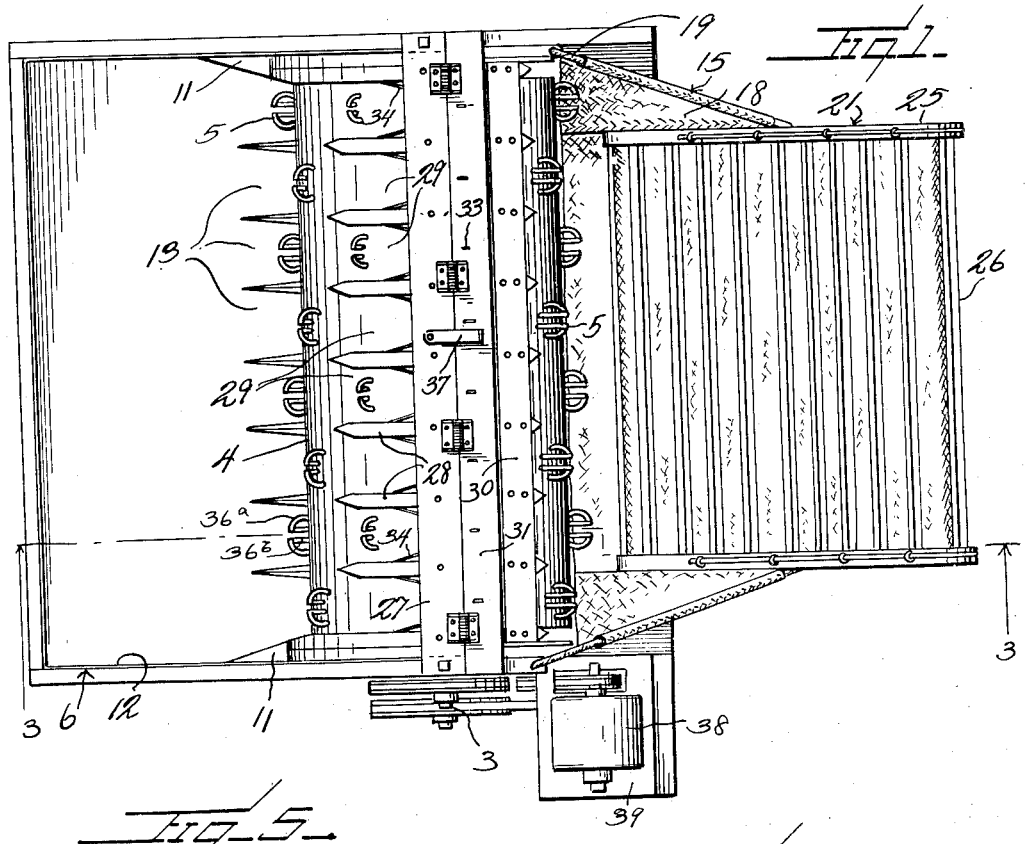
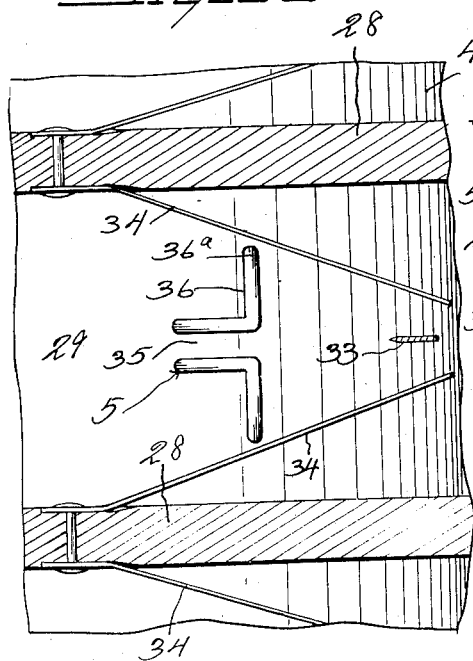
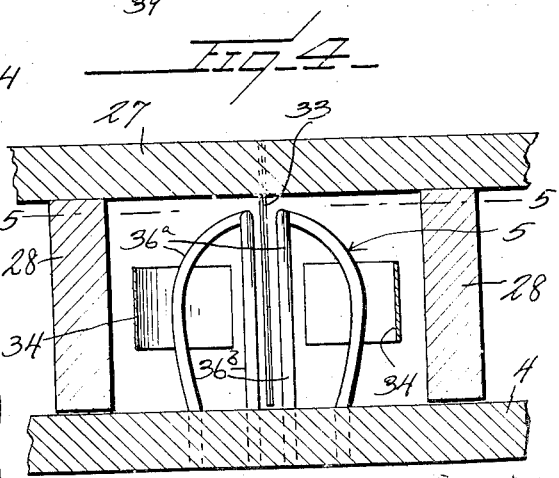
Inventor
John A. Cummings
By Watson E. Coleman
                Attorney Oct. 20, 1942.   J. A. CUMMINGS   2,299,567
SEED POTATO CUTTER
Filed July 8, 1941   2 Sheets-Sheet 2
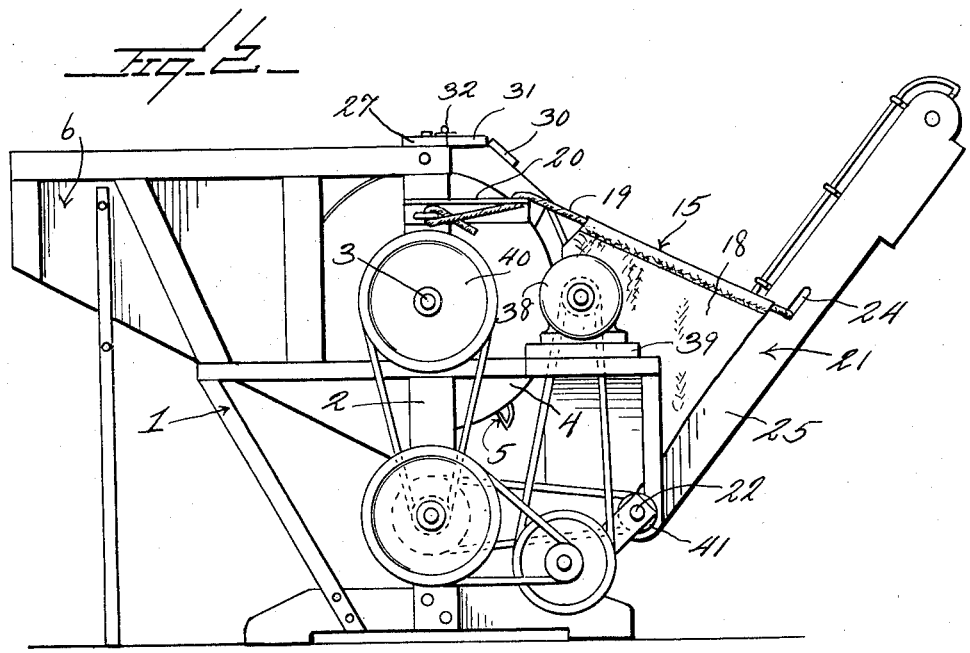
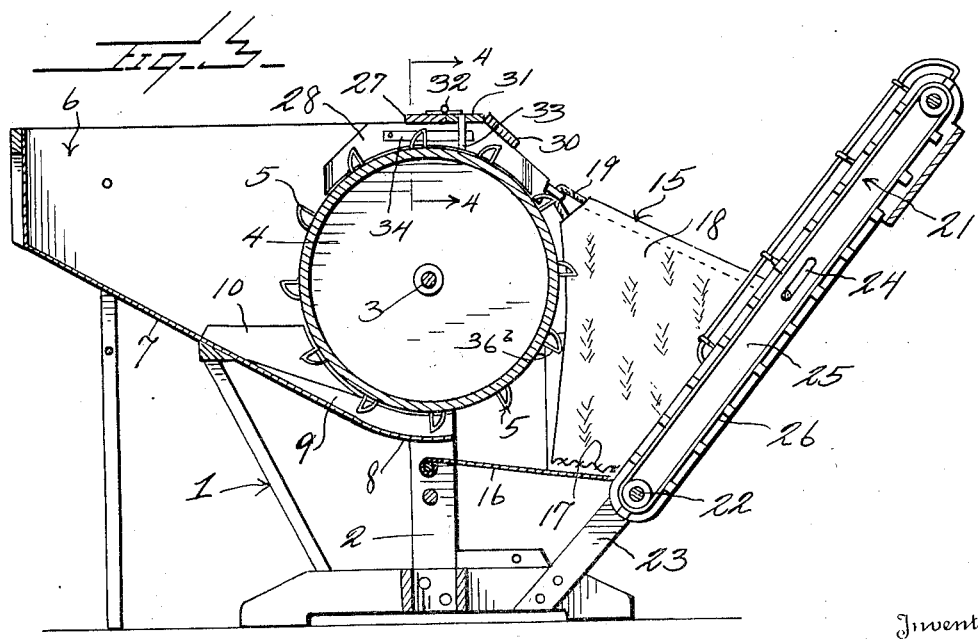
Inventor
John A. Cummings
By Watson E. Coleman
Attorney Patented Oct. 20, 1942

2,299,567

UNITED STATES PATENT OFFICE 2,299,567

SEED POTATO CUTTER

John A. Cummings, Benedicta, Maine, assignor of one-half to Harold T. Cummings, Benedicta, Maine Application July 8, 1941, Serial No. 401,490

6 Claims. (Cl. 146—59)

This invention relates to improvements in machines for cutting seed potatoes.

The primary object of the present invention is to provide an improved machine by which seed potatoes may be cut into halves automatically and rapidly without involving any hand operations.

Another object of the invention is to provide in a machine of the character stated, a novel means of picking up single potatoes and moving the same against a fixed cutting knife in such way as to divide the potato for the formation of two seed halves and thereafter discharge the halves into a receiver from which they are automatically removed to a suitable receptacle.

A still further object of the invention is to provide an improved seed potato cutting machine in which a novel means is provided for picking up each potato and holding and carrying the same with respect to a cutting knife whereby the potato will be evenly divided, such cutting knife being supported in a novel manner whereby it may be readily shifted out of operating or working position to be sharpened or replaced as desired, without necessitating the removal of any of the other working parts of the machine.

The invention will be best understood from a consideration of the following detailed description taken in connection with the accompanying drawings, it being understood, however, that the invention is not to be considered as limited by the specific illustration or description but that such illustration and description constitutes a preferred embodiment of the invention.

In the drawings:

Fig. 1 is a view in top plan of the machine embodying the present invention.

Fig. 2 is a view in side elevation of the same.

Fig. 3 is a sectional view on the line 3—3 of Fig. 1.

Fig. 4 is a fragmentary section taken substantially on the line 4—4 of Fig. 3.

Fig. 5 is a horizontal section taken on the line 5—5 of Fig. 4.

Referring now more particularly to the drawings, it will be seen that the present machine comprises a frame structure indicated generally by the numeral 1 which includes a pair of spaced parallel vertical side posts or standards 2 between which is supported a cylinder or drum shaft 3.

Upon the shaft 3 is mounted a drum 4 which carries a plurality of potato pickers 5 upon the periphery thereof, which pickers will be hereinafter more specifically described.

At one side of the drum 4, there is formed a bin 6 which is carried by the frame and which has a downwardly sloping floor 7 which extends under the drum, as shown in Fig. 3, and is slightly longitudinally curved, as indicated at 8, to correspond generally with the curvature of the drum. Upon the lower part of this floor 7 is a series of separators 9, each of which extends upwardly in a tapering edge 10 which is vertically directed, as is shown in Figs. 1 and 3. These dividers coact with one another and with tapered guide plates 11 disposed at the ends of the cylinder upon the inner sides 12 of the bin 6 to form a series of feed aisles 13, as shown in Fig. 1. The pickers 5 upon the drum 4 are arranged in rows extending around the drum and each row moves through an aisle 13 as the drum revolves, passing over and in close proximity to the lower portion 8 of the bin bottom 7, and in addition to picking up potatoes singly from the aisles, also prevent the potatoes from escaping from the bin under the drum.

It will be understood that the potatoes to be cut or divided are initially placed in the bin 6 and gravitate to the lower part thereof into aisles 13 from which they are removed by the pickers.

At the opposite side or rear of the machine from the bin 6 there is a receiving receptacle for the cut potatoes, which is indicated generally by the numeral 15. This receptacle comprises a bottom wall 16 over the rear part of which extends a canvas covering 17 which at its sides is extended upwardly to provide the side walls 18 which are maintained upright in a suitable manner as by the use of a cord or rope 19 attached at its ends to attaching or securing plates 20 which, as shown in Fig. 2, are mounted on the side uprights 2 of the frame.

At the rear side of the receptacle 18 in spaced relation with the drum is an endless conveyor unit 21, the lower part of which is supported upon a suitable shaft 22, which extends transversely of the machine and is supported at the rear edge of the bottom wall 16 by legs 23 which form a part of the frame structure. The rope 19 which maintains the walls 18 of the canvas part of the receptacle in upright position may be extended transversely through the conveyor by means of the slots 24 formed in the side rails 25 thereof, to pass between the upper and lower runs of the endless element 26 which forms a part of the conveyor structure. Thus it will be seen that cut potatoes, carried over in the manner hereinafter described by the pickers of the cylinder from the bin 6 to the receptacle 15, will be picked up by the conveyor to be carried upwardly and rearwardly for discharge into a suitable receiving receptacle. Extending across the machine above the drum 4 and parallel with the axis thereof is a plate 27 which is secured at its ends to the upper ends of the posts 2. Secured to the under side of this plate 27 to extend transversely thereof is a series of guide walls 28, each of which is of substantial length to extend beyond the front and rear edges of the plate 27 and has its lower edge longitudinally arcuate, as is shown in Fig. 3, to substantially follow the contour of the drum with which it is in relatively closely spaced relation. These guide walls are each in the same vertical plane with a spacer 9, so that there are formed between adjacent guide walls and between the end guide walls of the series and the guide plates 11 adjacent thereto, the upper aisles 29 which are alined circumferentially of the drum with the lower aisles 13. Along these aisles the potato pickers of the several rows pass in the rotation of the drum.

The rear ends of the guide walls 28 are coupled together and braced by the bracing bar 30 which is in spaced parallel relation with the plate 27, as shown in Fig. 1.

In the space between the plate 27 and the bar 30 there is disposed a knife bar 31 which extends the full length of the drum or, in other words, the full width of the machine, and this knife bar is connected by the spring hinges 32 with the plate 27. These hinges normally urge the knife bar to working position where it lies in the plane of the plate 27.

Secured to the knife bar 31 is a plurality or series of knives 33, each of which extends from the lower face of the knife bar into the center of the underlying aisle 29. There is one knife for each aisle and when the knife bar is down or in working position, the knife in each aisle extends from the bar toward and terminates in close proximity with the surface of the drum 4. The cutting edge of each knife is directed toward the bin 6 or in opposition to the direction of movement of the potatoes carried by the pickers 5.

Within each of the aisles 29 is located a pair of spring arms 34 which are secured to the adjacent guide walls to extend rearwardly in convergent relation, as shown in Fig. 5. These spring arms terminate at their rear ends upon opposite sides of and adjacent the rear of the adjacent knife 33 and they function to maintain the potatoes centered in the aisles as they are moved therethrough toward the cutting knives.

Each of the potato pickers 5 is in the form of a spoon-like unit which is fixed to the drum and which is longitudinally divided to provide the relatively narrow space 35 between the two portions 36 of the picker. The pickers may be formed of any suitable material but are most economically constructed of two formed wire sections which are so shaped that when they are disposed in side by side relation, they will provide the opposite outwardly bowed portions 36a forming the rim or outline of the spoon-like picker and the spaced parallel lower portions 36b, which form the bottom for the picker and also provide the narrow passage through the picker through which the knife passes.

The pickers are, of course, arranged upon the drum so that the tops thereof will face into the bin as the drum revolves in a clockwise direction, as shown in Fig. 3, and thus as the rows of pickers move into the lower part of the bin 6 through the aisles 13, each will receive and pick up a potato from the bin and carry it upwardly and through the upper aisles 29 toward the receiving receptacle 15. As the potatoes, each carried in one of the spoon-like pickers, enter the aisles 29, they will be engaged from opposite sides by the resilient centering arms 34 and maintained against movement as they come into contact with the cutting edges of the knives. The knives will, of course, pass through the passages 35 of the pickers and thus divide the potatoes into two sections, which will be deposited in the receptacle 15 in the manner described.

By mounting the knife bar 31 on hinges in the manner illustrated, the knives can be turned upwardly when necessary for re-sharpening or replacement. Any suitable form of latch, such as is shown in Fig. 1 at 37, may be employed for securing the knife bar in down or working position.

Any suitable means may be employed for rotating the drum 4 and for operating the endless conveyor 21. There is here shown an electric motor 38 mounted upon a suitable support 39 on the side of the machine which through a system of pulleys and belts, as shown in Fig. 2, may be operatively coupled with the driven pulley 40 mounted upon the adjacent end of the drum shaft 3 and with a pulley 41 mounted upon the shaft 22 of the conveyor. Obviously any other suitable means may be used for operating the machine, but with this arrangement, the entire operating mechanism is carried upon the machine frame so that the machine may be readily shifted as may be desired.

What is claimed is:

1. A potato cutting machine of the character stated, comprising a pair of adjacent units one comprising a bin and the other a cut potato receiving receptacle, a drum rotatably supported between the units, a plurality of picker members mounted upon the surface of the drum in rows extending circumferentially thereof, each of said units being of substantially spoon-like form and arranged upon rotation of the drum in one direction to move from the lower part of the bin upwardly therethrough to receive a potato from the bin, means extending over the drum transversely of the axis thereof forming a series of aisles along which the rows of pickers pass in moving from the bin toward the receptacle, and a pair of resilient arms disposed in each aisleway and extending from opposite sides thereof in convergent relation toward and terminating in close proximity to the adjacent cutting means to facilitate maintenance of a potato in position on the picker for cutting.

2. A machine of the character stated, comprising a pair of adjacent units constituting a potato receiving bin and a cut potato receiving receptacle, a drum rotatably supported between the units, a plate secured above the drum to extend longitudinally thereof, means in the lower part of said bin forming a plurality of aisles extending transversely of the drum axis, means carried by said plate above the drum forming a plurality of aisles extending transversely of the drum axis and each lying in the vertical plane of one of the first-mentioned aisles, a plurality of picker members secured to the periphery of said drum and arranged in rows extending circumferentially of the drum, each row of picker members being arranged to pass along the center of a lower aisle and the corresponding upper aisle, each of said pickers being designed to remove a potato from a lower aisle and carry it upwardly through the upper aisle, and means in each of said upper aisles for cutting into a prescribed number of parts a potato carried therethrough by a picker.

3. A machine of the character stated in claim 2, wherein said potato cutting means comprises a single straight knife disposed in each aisle in radial relation to the drum, and a bar extending lengthwise of the drum and pivotally connected with said plate and having said knives attached thereto whereby all of said knives may be moved as a unit toward and away from the drum.

4. In a machine of the character described for dividing edible bodies, a receptacle for such bodies, a cylindrical drum rotatably supported with its periphery in close relation with the bottom of the receptacle, means upon and standing outwardly from the peripheral surface of the cylindrical body for picking up the edible bodies from the receptacle and carrying the same to the top of the cylinder when the latter is rotated in one direction, means providing a plurality of circumferentially extending aisles at the top of the cylinder along with the body pick-up means pass, a carrier body supported over said aisles and extending longitudinally of the cylinder, said carrier body being supported to be swung away from the cylinder on a pivotal axis extending lengthwise thereof, knives carried by the carrier body in position to extend one knife into each aisle upon the longitudinal center of the latter and to terminate in close proximity to the cylinder, the said body pick-up means being formed for the passage of said knife therethrough.

5. In a machine for dividing edible bodies, a receptacle for such bodies, a cylinder supported within the receptacle for rotation on a horizontal axis, the periphery of the cylinder being in relatively close proximity to the body of the receptacle, a plurality of two part cup-like members secured to and extending radially from the peripheral surface of the cylinder and adapted to move through the receptacle upon rotation of the cylinder in one direction to each pick up one of the edible bodies from the receptacle and carry the same to the top of the cylinder, a support extending longitudinally of and over the top of the cylinder, a plurality of spaced parallel arcuate partitions secured to said support and extending transversely of the cylinder to form a series of circumferentially extending aisles along which said body pick-up members pass, a carrier hingedly secured to said support and extending longitudinally of the cylinder, the carrier being oscillatable from a normal working position with respect to the cylinder away from the cylinder, a plurality of knives secured to the carrier and each extending toward the cylinder in the center of an aisle when the carrier is in normal working position, and the two parts of each pick-up member passing upon opposite sides of a knife upon rotation of the cylinder in the said one direction.

6. A structure as set forth in claim 5 including a pair of relatively long yieldable arms disposed in each aisle and each secured to one of said spaced parallel members, the arms extending in convergent relation toward the path of travel of a body pick-up member through the aisle and terminating adjacent the sides of the adjacent knife.

JOHN A. CUMMINGS.